United States Patent [19]

Volk, Jr. et al.

[11] Patent Number: 4,729,899
[45] Date of Patent: Mar. 8, 1988

[54] METHOD FOR CONTROLLED FAT INJECTION WITH STEAM IN A PELLET MILL

[75] Inventors: Joseph A. Volk, Jr., Florissant; Mark R. Kniepmann, St. Louis, both of Mo.

[73] Assignee: Beta Raven Inc., St. Louis, Mo.

[21] Appl. No.: 45,547

[22] Filed: May 4, 1987

Related U.S. Application Data

[62] Division of Ser. No. 755,082, Jul. 15, 1985, Pat. No. 4,678,424.

[51] Int. Cl.⁴ ............................ A23P 1/02; A23P 1/08
[52] U.S. Cl. ..................................... 426/307; 118/24; 264/129; 425/331; 426/438; 427/212
[58] Field of Search ................. 425/311, 331, 404, 92, 425/94, 96, 104, DIG. 230; 165/113; 427/212; 426/438, 307; 364/468; 118/19, 20, 24, 303; 99/467, 468, 483, 485, 486, 516; 366/144; 264/129

[56] References Cited

U.S. PATENT DOCUMENTS

| | | | |
|---|---|---|---|
| 2,336,114 | 12/1943 | Meakin | 425/331 X |
| 2,432,326 | 12/1947 | Meakin | 425/331 X |
| 2,887,718 | 5/1959 | Curran et al. | 425/331 X |
| 2,980,543 | 4/1961 | Hale et al. | 426/307 |
| 3,014,800 | 12/1961 | Guidarelli | 426/307 X |
| 3,101,040 | 8/1963 | Lanz | 427/212 X |
| 3,707,978 | 1/1973 | Volk, Jr. | 137/2 |
| 4,183,292 | 1/1980 | Banks | 99/468 |
| 4,183,675 | 1/1980 | Zarow | 366/144 |
| 4,340,937 | 7/1982 | Volk, Jr. | 364/468 |
| 4,342,361 | 8/1982 | Volk, Jr. | 165/113 |

*Primary Examiner*—Richard L. Chiesa
*Attorney, Agent, or Firm*—Rogers, Howell, Moore & Haferkamp

[57] ABSTRACT

A fat injection process for a pellet mill includes a plurality of nozzles mounted within the pelleting chamber and adjacent the die and rollers with a steam and fat line connected to each nozzle for mixing fat with steam and spraying the mixture onto the pellets immediately as they are formed.

6 Claims, 1 Drawing Figure

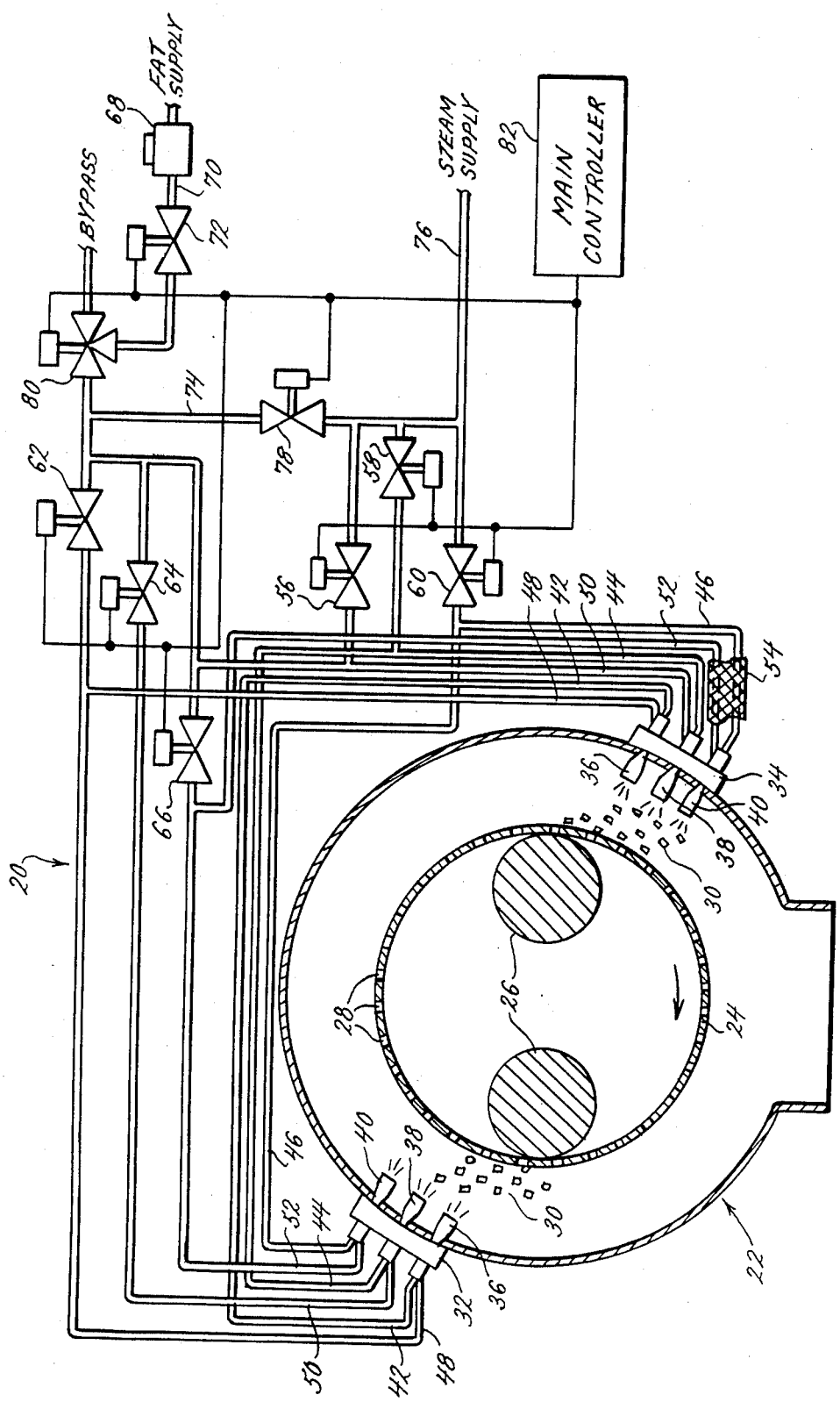

METHOD FOR CONTROLLED FAT INJECTION WITH STEAM IN A PELLET MILL

This is a division of co-pending application Ser. No. 755,082 filed on July 15, 1985, now U.S. Pat. No. 4,678,424 issued July 7, 1987.

BACKGROUND AND SUMMARY

The pelleting of food materials from various ingredients is well known in the art and the inventor herein is also the inventor of several different controllers which have revolutionized the pelleting process by automating pelleting. Some of the patents which have issued for his devices include the following: U.S. Pat. Nos. 3,707,978; 3,932,736; 4,340,937; 4,342,361; 4,463,430; and other patent applications which are pending.

It is well known in the art of pelleting that it is desirable to add fat into the finished pellet in controlled amounts. Generally, this is done by spraying hot liquid fat onto the pellets at some point after they have been formed and given an opportunity to dry. An example of this is shown in U.S. Pat. No. 3,101,040 issued Aug. 20, 1963. As shown therein, a special rotating drum is utilized to stir the pellets and a pipe with several nozzles extends the length of the drum and sprays hot fat onto the finished pellets. There are several disadvantages with the apparatus and method of the referenced patent, including the tendency of the fat to coat the surface of the pellet and not penetrate into the substance of the pellet itself which not only renders the fat coating subject to being removed by handling of the pellets, but also limits the amount of fat that can be added without introducing the problems of stickiness and congealing of the coating which is undesirable. Furthermore, the pipe and sprayers conducting the liquid fat are subject to clogging during use which detracts from the efficiency of the apparatus in coating the pellets with fat.

To solve these and other problems, the inventor herein has succeeded in developing a novel apparatus and method of utilizing steam as a carrier for the liquid fat, and also spraying the pellets immediately as they are formed within the chamber containing the pelleting die and rollers. With this approach, the fat has a greater tendency to migrate into the substance of the pellet both because of the increased moisture content of the pellet itself and the additional moisture and energy added by the steam. Thus, a greater amount of fat may be added to the pellets. Furthermore, there is no requirement for an additional rotating drum or other mechanical structure to achieve the application of fat to the pellets which minimizes initial cost for the equipment as well as decreased maintenance expenses and the like. In implementing the inventor's new apparatus and method for achieving fat injection with steam in the pellet mill, he has also developed a related control system which provides a method for regulating the amount of fat injected into the system, and also a way of utilizing steam to blow out the fat supply lines at the end of a run to minimize any tendency of the lines to clog, even temporarily, as might be experienced with the apparatus of the prior art.

A separate fat injection controller can be provided to control the various valves utilized to regulate and control the flow of fat and steam to the pellet mill, or the control for the fat injection system of the present invention may be incorporated into one of the inventor's prior automatic pelleting control systems using techniques well known to those of ordinary skill in the art. For example, for a microprocessor based controller, it would be a simple matter for one of ordinary skill in the art to modify the software program resident therein to control the additional functions required for fat injection using the inventor's apparatus and method disclosed and claimed herein.

The foregoing represents a brief description of some of the principal advantages and features of the present invention. A more complete understanding may be gained by referring to the drawing and description of the preferred embodiment which follows.

BRIEF DESCRITION OF THE DRAWINGS

The sole FIGURE is a schematic representation of the fat injection system of the present invention.

DETAILED DESCRIPTION OF THE PREFERRED EMBODIMENT

The fat injection system 20 of the present invention is shown in the drawing and includes a pellet mill 22 having a die 24 with a pair of rollers 26, the rollers 26 being situated substantially adjacent the die 24, and the die 24 having a plurality of holes 28 therethrough such that pellets 30 are formed as the die 24 and rollers 26 rotate. As is known in the art, the angular momentum of the die 24 imparts an angular velocity to the pellets 30 immediately as they are formed. A first group of nozzles 32 is mounted at about the ten o'clock position of the pellet mill 22 and a second group of nozzles 34 is mounted at approximately the four o'clock position. Each of these groups 32, 34 has three nozzles 36, 38, 40, and each of these nozzles may be appropriately sized to provide for different flow rates. For example, in the preferred embodiment, nozzle 36 would be a quarter inch, nozzle 38 would be threeeighths inch, and nozzle 40 would be one-half inch. Each nozzle 36, 38, 40 has an associated steam line 42, 44, 46 and an associated fat line 48, 50, 52, respectively. As shown representationally in the drawing, each pair of associated supply lines may be formed within a stainless steel braided hose 54 to provide both flexibility and some amount of heat transfer between the steam line and the fat line to minimize the tendency of the fat to congeal and clog the line.

Each associated steam line 42, 44, 46 has an associated steam valve 56, 58, 60, respectively to control the flow of steam through the associated steam supply lines. Similarly, each associated fat supply line 48, 50, 52 has an associated fat nozzle valve 62, 64, 66, respectively to control the flow of fat to its associated nozzles. A flow meter 68 provides an indication of the flow rate of fat through the main fat supply line 70, and a main modulating valve 72 regulates the amount of fat flowing through the main supply line 70 to the associated fat lines 48, 50, 52. An interconnecting line 74 extends between the main steam supply line 76 and the main fat supply line 70, and a steam blowout valve 78 acts in concert with a line bypass valve 80 to divert the flow of fat from the main fat supply line 70 and apply steam therethrough to the associated fat supply lines 48, 50, 52 to blow out the fat remaining in the lines and nozzles at the end of a run. A main controller 82, which may be a separate controller or which may be incorporated as part of the automatic pelleting system, controls the various valves in the fat injection system 20 of the present invention to not only regulate the supply of fat through the main fat supply line 70, but also select the appropriate size and number of nozzles 36, 38, 40 as is appropriate and desired to spray the fat and steam mixture onto the pellets 30 as they exit the die 24.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. A method for applying a coating of fat to pellets immediately as they are formed in a pellet mill, the pellet mill comprising a rotating die, the die having a pluralty of holes through which the material to be pelleted is forced to form the pellets, said method comprising the steps of mixing the fat with steam and spraying the steam/fat mixture onto the pellets immediately as they emerge through the holes in the die.

2. The method of claim 1 further comprising a plurality of spray nozzles, and wherein the step of mixing comprises separately feeding the fat and steam to each of said spray nozzles.

3. The method of claim 2 wherein the rotating die is contained in a chamber, the spray nozzles being mounted to said chamber, and further comprising the step of regulating the flow of fat and steam to a selected number of said spray nozzles.

4. The method of claim 3 wherein a group of spray nozzles is mounted at each of at least two locations, and wherein the step of regulating further comprises regulating the flow of fat and steam to selected spray nozzles of each group.

5. The method of claim 4 wherein each spray nozzle has a plurality of orifices, the size of said orifices for one spray nozzle being different than those of another spray nozzle within the same group, and wherein the step of regulating further comprises selecting one or more spray nozzles from each group with regard to the size of their orifices and the throughput of the pellet mill.

6. A method for applying a coating of fat to pellets immediately as they are formed in a pellet mill, the pellet mill comprising a rotating die within a chamber, the die hvaing a plurality of holes through which the material to be pelleted is forced to form pellets, a plurality of spray nozzles mounted at each of at least two locations, said spray nozzles being oriented to spray directly onto said pellets as they are formed within the chamber, a steam line and a fat line associated with each spray nozzle, the method comprising the steps of mixing the fat with steam inside each of said nozzles, and spraying the steam/fat mixture onto the pellets immediately as they emerge from the die.

* * * * *